(12) United States Patent
Bytheway

(10) Patent No.: US 9,483,668 B2
(45) Date of Patent: Nov. 1, 2016

(54) METHOD OF SECURING VOLUMES OF SPACE IN CARD READERS

(71) Applicant: CIRQUE CORPORATION, Salt Lake City, UT (US)

(72) Inventor: Jared G. Bytheway, Sandy, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 0 days.

(21) Appl. No.: 14/928,081

(22) Filed: Oct. 30, 2015

(65) Prior Publication Data

US 2016/0070939 A1    Mar. 10, 2016

Related U.S. Application Data

(63) Continuation-in-part of application No. 12/117,565, filed on May 8, 2008.

(60) Provisional application No. 60/916,624, filed on May 8, 2007, provisional application No. 60/939,797, filed on May 23, 2007, provisional application No. 60/986,060, filed on Nov. 7, 2007.

(51) Int. Cl.
| | |
|---|---|
| *G06K 7/00* | (2006.01) |
| *G06F 17/00* | (2006.01) |
| *G01R 27/26* | (2006.01) |
| *G01V 3/02* | (2006.01) |
| *G06F 3/044* | (2006.01) |
| *G06F 21/83* | (2013.01) |

(52) U.S. Cl.
CPC .......... *G06K 7/0095* (2013.01); *G01R 27/2605* (2013.01); *G01V 3/02* (2013.01); *G06F 3/044* (2013.01); *G06F 21/83* (2013.01)

(58) Field of Classification Search
USPC .................... 235/379, 380, 438–441, 482
See application file for complete search history.

(56) References Cited

U.S. PATENT DOCUMENTS

| | | | | |
|---|---|---|---|---|
| 5,305,017 | A * | 4/1994 | Gerpheide | G06F 3/0213 345/168 |
| 6,222,528 | B1* | 4/2001 | Gerpheide | G06F 3/044 345/173 |
| 2002/0083858 | A1* | 7/2002 | MacDiarmid | B41M 3/006 101/484 |
| 2003/0210286 | A1* | 11/2003 | Gerpheide | G06F 3/04847 715/863 |
| 2005/0156912 | A1* | 7/2005 | Taylor | G06F 3/03545 345/179 |
| 2006/0262101 | A1* | 11/2006 | Layton | G06F 3/044 345/173 |
| 2007/0291014 | A1* | 12/2007 | Layton | G06F 3/03547 345/173 |
| 2008/0273017 | A1* | 11/2008 | Woolley | G06F 3/04847 345/173 |

* cited by examiner

*Primary Examiner* — Tuyen K Vo
(74) *Attorney, Agent, or Firm* — Morriss O'Bryant Compagni, PC

(57) ABSTRACT

Capacitive sensing electrodes may be placed in strategic locations inside, outside or inside and outside of a card reader, wherein touch sensor circuitry is then used to take mutual capacitance or self-capacitance measurements that are saved in non-volatile memory as a reference intrusion measurement that is not deleted when power is removed, wherein the reference intrusion measurement may then be used during subsequent intrusion measurements to determine if a skimming device has been disposed adjacent to the card reader, and if a skimming device is detected, appropriate action may be taken such as the automatic disabling of the card reader, the display of a message indicating that the card reader should not be used, or any other action that may prevent a financial card from being compromised.

8 Claims, 10 Drawing Sheets

METHOD OF SECURING VOLUMES OF SPACE IN CARD READERS

BACKGROUND OF THE INVENTION

1. Field of the Invention

This invention relates generally to card readers. More specifically, the present invention relates to the ability to detect skimming devices that are attached to the outside of a financial card reader or inserted in a slot of a financial card reader by using capacitive sensing technology.

2. Description of Related Art

There are several designs for capacitive sensors that may be used to accomplish the purposes of the present invention. One of the existing capacitive sensor designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

With this understanding of one capacitive sensor design, it is now possible to discuss the present invention and a particular application.

A problem has arisen with financial card readers that are capable of reading smart contact or magnetic stripe cards. These cards may be used in financial transactions, for identity verification, access control or other uses. Specifically, skimming devices may be placed on the outside or the inside of card readers to try and steal primary account numbers (PANs) and/or personal identification numbers (PINS). Unfortunately, preventing a skimming device from being attached to the outside of a card reader or inside the card slot may be very difficult.

One effort to prevent the insertion of a skimming device is that the size of the card slot has been reduced to be just slightly thicker than the card to be inserted. However, thin film skimming circuits may still be inserted in order to perform a 'man in the middle' attack.

An alternative to disposing the skimming device on the inside of a card slot may be to place the skimming device on the outside of card readers. Unfortunately, skimming devices have become very professional looking and may now be very difficult to identify visually as well as by some sort of sensor. Some limited success may have been achieved by using cameras to inspect surfaces for skimming devices.

Some skimming devices may also take the form of a camera that may be attached to ATMs in order to capture an image of a card, thereby acquiring the PAN and a video of PIN numbers as they are entered on a keypad.

It would be an advantage over the prior art to be able to use capacitive technology to detect skimming devices.

BRIEF SUMMARY OF THE INVENTION

In a first embodiment, the present invention uses capacitive sensing electrodes may be placed in strategic locations inside, outside or inside and outside of a card reader, wherein touch sensor circuitry is then used to take mutual capacitance or self-capacitance measurements that are saved in non-volatile memory as a reference intrusion measurement that is not deleted when power is removed, wherein the reference intrusion measurement may then be used during subsequent intrusion measurements to determine if a skimming device has been disposed adjacent to the card reader, and if a skimming device is detected, appropriate action may be taken such as the automatic disabling of the card reader, the display of a message indicating that the card reader should not be used, or any other action that may prevent a financial card from being compromised.

In a first aspect of the invention, the present invention is not limited to a card reader, but the electrodes may be disposed near any device where tampering detection is needed.

These and other objects, features, advantages and alternative aspects of the present invention will become apparent to those skilled in the art from a consideration of the following detailed description taken in combination with the accompanying drawings.

BRIEF DESCRIPTION OF THE SEVERAL VIEWS OF THE DRAWINGS

FIG. 6 is a perspective view of a substrate having a perforation that will tear, breaking an ITO electrode if the substrate were to be tampered with.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

While many embodiments of the present invention utilize a general purpose touchpad, other capacitance sensing devices that are not touchpads can be used to achieve the same results, and should be considered to be within the scope of the present invention. But when a touchpad is used to implement the present invention, the touchpad can be dedicated to providing detection of an intruding sensor, or to operate to provide intrusion detection and touchpad functionality. Accordingly, use of the term touchpad should not be construed as limiting the present invention.

The present invention is focused on adapting a general purpose touchpad to provide two types of tampering or intrusion detection. The first type of intrusion detection uses the electrodes of a touchpad to perform general tampering detection. This first type of tampering detection is always enabled, and does not require operation of the device for detection to occur.

The second type of tampering detection also uses a touchpad, but is focused exclusively on touch or proximity sensing of keys that are used as part of a keypad to enter data, such as a PIN. This second type of tampering detection only operates when a key is actually pressed. Both the first and second types of tampering detection use a compensation matrix, as will be explained.

The first embodiment of the invention is a capacitance sensitive touchpad, such as a touchpad manufactured by CIRQUE® Corporation. As explained above, the CIRQUE® capacitance sensitive touchpad provides an XY electrode sensor grid. Such a touchpad is capable of detecting the presence of a pointing object, such as a finger, stylus or button in contact with or in proximity of a touchpad sensing surface. The distance at which proximity sensing can detect and track a pointing object depends upon the specific touchpad hardware being used. However, what is important is that detection and tracking are both possible without physical contact.

Figure 1:
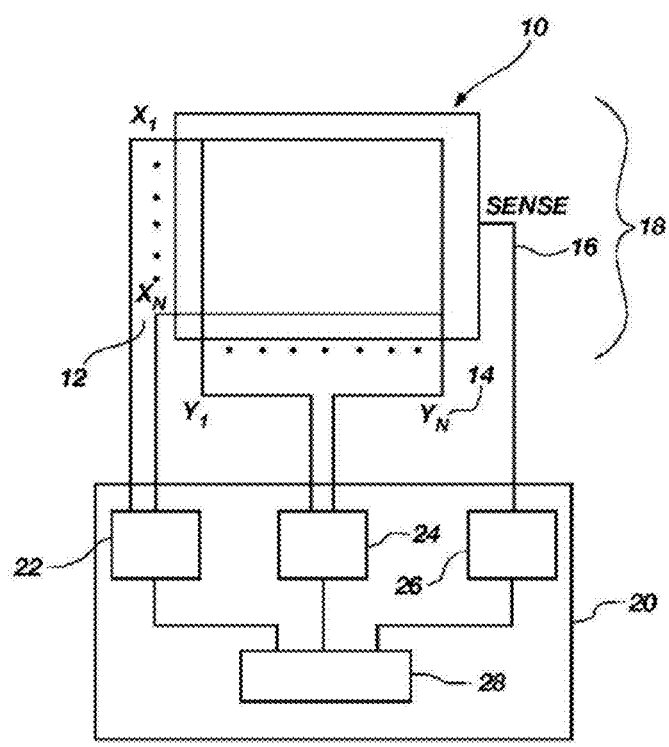
FIG. 1 is a schematic diagram of the prior art capacitance sensitive touchpad provided by CIRQUE® Corporation.
Figure 2:
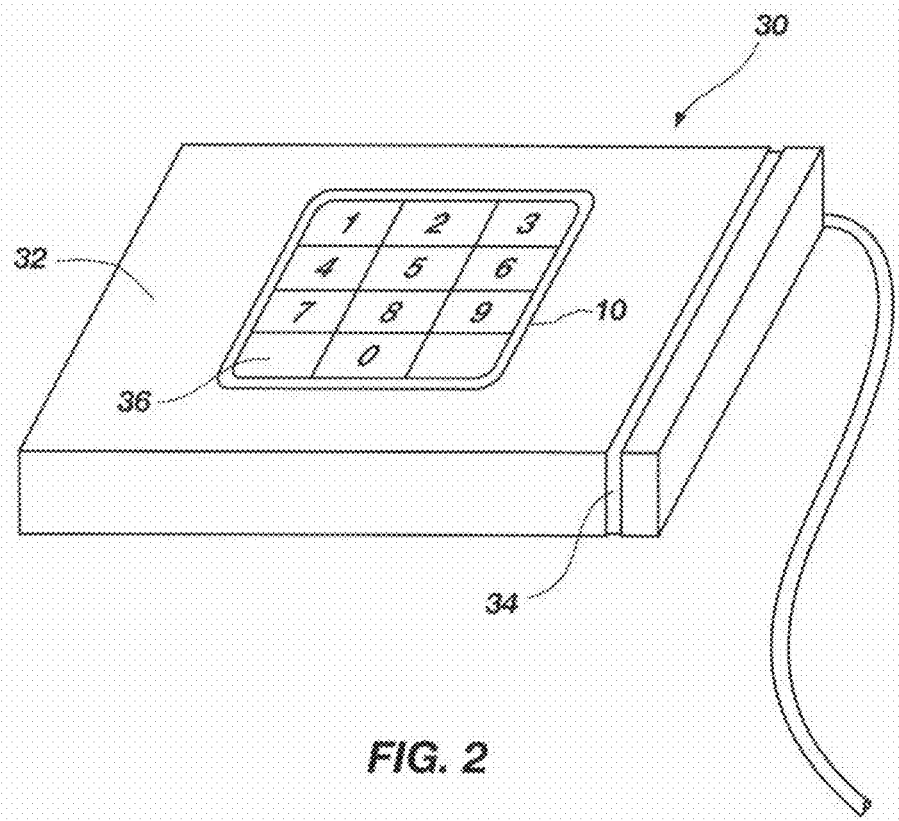
FIG. 2 is a perspective view of a PED with a magnetic card swipe slot and a keypad disposed over a touchpad.

FIG. 2 is a perspective view of a PED 30 as envisioned in the present invention. It should be remembered that the PED 30 can be any device that can be tampered with. In this embodiment, the PED 30 has its own housing unit 32. This particular PED 30 includes a slot 34 having a magnetic strip reader disposed therein. A keypad 36 is provided for entering PIN data. The individual keys of the keypad 36 can be constructed using any type of key mechanism. What is important is that the keypad 36 is disposed over a touchpad 10 that is disposed under the keypad. The touchpad 10 can be disposed on the outside of the housing unit 32 or inside it because of proximity sensing capabilities.

The PED 30 can be altered to include other features or different features. For example, the PED 30 can include a touchpad for recording a signature, or a touchpad having virtual buttons that replace the mechanical keypad 36. Alternatively, the PED 30 can be any other device that requires a means for determining if the device has been tampered with.

The present invention uses the concept of a compensation matrix to provide intrusion detection (also referred to as "tampering" or "tampering detection"). A compensation matrix is a tool used by a touchpad for calibration. Calibration enables a touchpad to compensate for the internal variances such as manufacturing variances of the XY electrode grids and external variances such as a housing or enclosure in which the touchpad is disposed for operation. Calibration is the process wherein these variances such as imbalances in electrical charges on electrodes are "zeroed" out by the creation of a compensation matrix so that they can be ignored, as is understood by those skilled in the art of touchpads. By storing the measured imbalances in the compensation matrix, these imbalances can be eliminated when the touchpad is being used.

The compensation matrix may be created just once at the time of manufacture if it is anticipated that the operating environment of the touchpad is unlikely to change. Alternatively, the compensation matrix might be recreated on the fly each time that the touchpad is activated. What is important in the present invention is that the compensation matrix can be stored. Storing the compensation matrix makes it possible for the touchpad to compare its current operating environment to the operating environment that existed when the stored compensation matrix was created. This comparison enables the present invention to determine if a change has occurred in the operating environment. A change in the operating environment is going to be interpreted as detection of intrusion or tampering.

Accordingly, when the touchpad 10 is disposed within a PED 30, the compensation matrix is typically calibrated one time only. However, the present invention should not be considered to be limited to a single calibration operation, especially if there may be a valid reason for the operating to change, such as the opening of the housing unit 32 by a qualified technician. Thus it is an aspect of the present invention to provide for recalibration and thus recreation of the compensation matrix when necessary.

This calibration procedure is sufficient to enable the touchpad to operate in whatever environment that the PED 30 is being used. Typically, no further calibration is needed to create the stored compensation matrix, and the PED can be operated in almost any environment without affecting the calibration of the detection system. But it is this ability to recalibrate or create a new compensation matrix for comparison to a stored compensation matrix that enables the present invention to provide detection of an intruding sensor within the environment of the PED 30.

The compensation matrix can be created by making a plurality of measurements of the XY electrode grid when the touchpad 10 is not being used. In other words, no conductive or dielectric materials should be placed within the sensing range of the touchpad 10 except for the physical environment in which the touchpad is going to operate. The next step is to transmit a series of signals (signal patterns) to various electrodes of the touchpad 10. Measurements are then taken of the response of the touchpad 10 to the signal patterns. These signal patterns and the corresponding response of the touchpad 10 are then stored in the compensation matrix.

To make a comparison of the stored compensation matrix and a new compensation matrix, the touchpad should perform an intrusion detection procedure. The first step is to have the same signal patterns transmitted to the touchpad 10 and compared to the original touchpad responses that are in the stored compensation matrix. The compensation matrix is typically but not necessarily stored in non-volatile memory of the touchpad circuitry. The new compensation matrix that is created to compare to the stored compensation matrix does not need to be in non-volatile memory as it is a temporary matrix used for comparison purposes only. However, it may be desirable to store the temporary compensation matrix so that the conditions that caused a positive intrusion detection situation can be verified or studied.

The intrusion detection using the compensation matrix for the touchpad 10 operates at all times. In other words, the intrusion detection is always on if the touchpad 10 is turned on. However, even if the PED 30 or other device is turned off when an intruding sensor is being installed, as is likely the case, the touchpad 10 should always perform the intrusion detection procedure immediately after being started so that it can determine if there has been any tampering before accepting any information that might be compromised.

The first type of intrusion detection described above is a versatile intrusion detection system that can be modified extensively because of the nature of the touchpad 10. In other words, electrodes from the touchpad 10 can be disposed in ways other than or in addition to the typical planar XY orthogonal electrode grid as discussed previously. While the first embodiment of the present invention uses a typical touchpad 10, alternative electrode arrangements can be used. For example, the X and Y electrodes may be arranged so that the electrodes are disposed as shown in FIG. 3.

Figure 3:
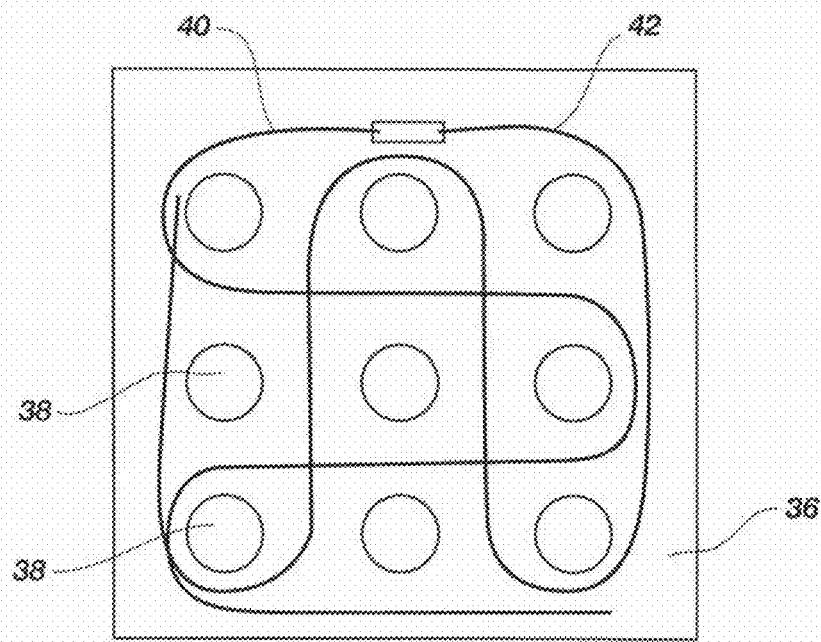
FIG. 3 is a top view of a keypad with an X and SENSE electrode disposed throughout the keypad.

In FIG. 3, the keypad 36 is shown with 9 mechanical keys 38. This example of 9 keys 38 is for illustration purposes only, and should not be considered a limiting factor. More or fewer keys 38 can be used.

In this first alternative embodiment, it is not necessary to implement a complete or typical XY touchpad 10 as explained above. A capacitance sensing circuit can be provided that is not used for input, but is instead dedicated to intrusion detection. In a touchpad or in a dedicated intrusion detection system, at least two electrodes that are coupled to touchpad circuitry can be used to detect tampering with a PED 30.

As shown in FIG. 3, a single X electrode 40 and a SENSE electrode 42 can be placed near the keys 38 of the PED 30 by running each electrode 40, 42 around the keys in a suitable pattern. The pattern should be sufficient to detect an intruding sensor capable of detecting signals.

For example, as shown in FIG. 3, the X electrode 40 is shown running between the keys 38 of the keypad 36. An insulating material is then disposed over the X electrode 40. Then the SENSE electrode 42 is also run between the keys 38 of the keypad 36 and over the X electrode 40, while remaining electrically separate therefrom.

The next step is to place a template or other outer covering over the X and SENSE electrodes 40, 42 so that they would not be visible. Alternatively, the X and SENSE electrodes could be disposed underneath the keypad surface shown, in other words on the interior of the PED 30 so that they would now be inside the PED and not visible to someone looking underneath the keys 38.

The intertwining pattern shown in FIG. 3 of the X and SENSE electrodes 40, 42 is used for illustration purposes only. The exact pattern used and the spacing of the electrodes 40, 42 can be modified as needed, and should not be considered to be a limiting factor of the invention. In addition, it should be mentioned that the X electrode can be substituted by the Y electrode, and its selection was also arbitrary, and the X, Y and SENSE electrodes can function interchangeably in the present invention.

This first alternative embodiment is a simple and yet effective way to detect the presence of an intruding sensor being disposed on or near the keys 38 of a PED 30. Just as a complete touchpad is calibrated, the single X electrode and SENSE electrode can also be calibrated and a compensation matrix is created, even if it is relatively simple in comparison to a compensation matrix required for the greater number of X and Y electrodes of a complete touchpad 10.

The introduction of an intruding sensor is again detected by comparing the response of the X and SENSE electrodes 40, 42 to a signal transmitted on the electrodes, and then making a comparison between the new compensation matrix and the stored compensation matrix to find any change. However, it should be realized that in this case, the X and SENSE electrodes are not part of the operation of the PED 30. The X and SENSE electrodes 40, 42 are dedicated to the function of intruding sensor detection.

Figure 4:
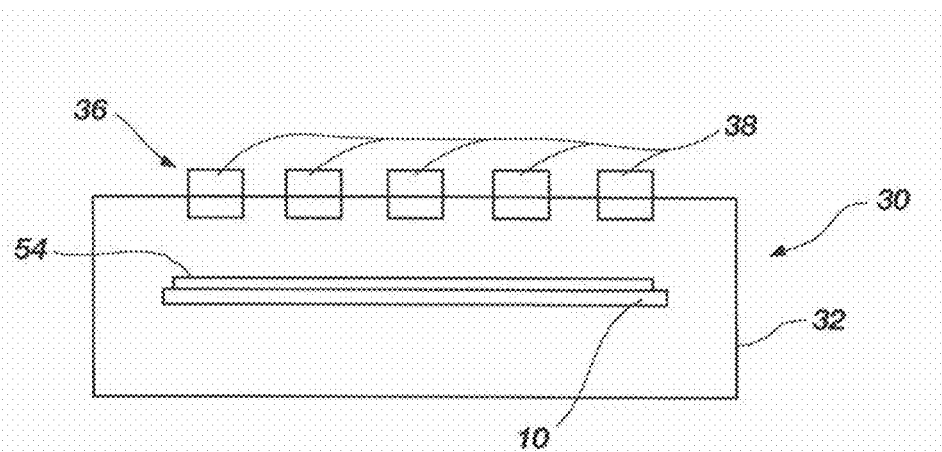
FIG. 4 is a cut-away profile view of a PED showing the capacitance sensitive touchpad, a keypad and an intruding sensor.

FIG. 4 is provided as a profile cut-away view of a PED 30 having a housing 32. It is known that one method of compromising the security of a PED 30 is to open the housing 32 and insert an intruding sensor 54 that will detect the information that is input to the PED during normal PED operation. The most obvious location for inserting an intruding sensor 54 is between the keys 38 of a keypad 36, and the touchpad 10 with which the keys are making contact as shown in FIG. 4. The intruding sensor 54 can be detected by the capacitance sensitive touchpad 10 by the effect that the intruding sensor 54 will have on the touchpad 10 and thus the compensation matrix.

An intruding sensor 54, as used herein, is defined as any sensor or portion thereof that is being placed on or inside at least a portion of the PED 30 in order to detect data that is being input to the PED. Accordingly, an intruding sensor 54 may be nothing but a simple electrode, a fiber optic cable, or any other sensor that can perform data input detection as is known to those skilled in the art of sensors. It is noted that the data does not even need to be transported away from the intruding sensor 54, but can instead be recorded for future retrieval.

The intruding sensor 54 will affect the electrical balance of the touchpad 10 because it is a conductive and/or a dielectric material. The imbalance caused by the conductive and/or dielectric material will not have been compensated for by the stored compensation matrix because the calibration that was performed was for the original operating environment without the intruding sensor 54 being present. Accordingly, it is only necessary to perform the intrusion detection procedure and compare the new compensation matrix to the stored compensation matrix to determine if the operating environment of the touchpad 10 has been altered.

Even though the intruding sensor 54 can be detected because of the changes that will occur in the electrical balance of the electrodes in the touchpad 10, that does not necessarily mean that the PED 30 would stop functioning. If the PED 30 were no longer to function, it would be an obvious signal to the person who is tampering that the intruding sensor 54 interferes with normal operation, and the attempt at stealing data would be abandoned. Thus, it is possible for the PED 30 to function normally even though there is an imbalance in the detection system. For example, the PED 30 could send an alert that the PED has been tampered with, then recalibrate for the presence of the intruding sensor 54 and continue operating.

However, the touchpad 10 of the present invention may not have to perform any recalibration in order to continue functioning. The touchpad of the present invention is often able to continue operation even in the presence of the imbalance on electrodes of the touchpad 10. Thus, in this first embodiment, it would be a routine function of a PED 30 to perform a comparison with values stored in the compensation matrix to determine if the initial operating environment for which the touchpad 52 was calibrated has been materially altered. Performing the intrusion detection procedure should be performed at start up of the touchpad, but should also be performed periodically when the touchpad has been in on for a predetermined period of time, in case an intruding sensor 54 is disposed within the operating environment of the touchpad 10 without the touchpad being turned off.

Another aspect of this first embodiment of the present invention is the distance from the surface of the touchpad 10 that the intruding sensor 54 is detectable. The keys 38 of the PED 30 are going to be separated from the touchpad 10 by some distance. This distance is likely to be relatively small. The present invention is capable of detecting the intruding sensor 54 even if it is not placed directly on the surface of the touchpad 10. The intruding sensor 54 can be detected at least up to and possibly beyond 1 cm above the surface of the touchpad 10.

In an alternative embodiment of the invention, it is envisioned that the electrodes of the touchpad might be installed in such a way so that moving of the electrodes is detectable. The use of Indium-tin-oxide (ITO) as electrodes of touchpads is well known to those skilled in the art of CIRQUE® Corporation touchpads. However, other materials can also be used in place of ITO that will also provide the same functionality in these embodiments, and so the present invention should not be considered limited to ITO.

Figure 5:
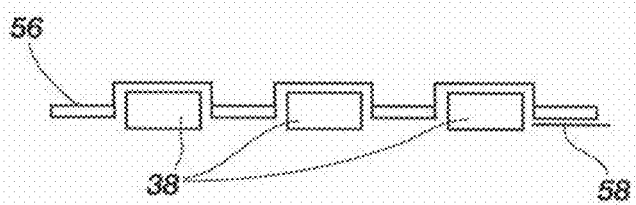
FIG. 5 is a cut-away profile view of a keypad, a cover template and at least one ITO electrode that will break if the cover template is removed from the keypad.

In FIG. 5 various layers of a PED 30 are shown that can be used with ITO electrodes, because a useful property of ITO is that it is brittle. When a PED 30 is being tampered with, a person attempting to insert an intruding sensor 54 into a PED may be forced to pry off a cover template 56 disposed over the keys 38 to seal them so that an intruding sensor 54 cannot be put underneath them. The intruding sensor 54 is disposed under the cover template 56, and then the cover template is put back in place. The cover template 56 can be sealed against the housing 32 or against the keypad 36. ITO electrodes 58 can be placed between the cover template 56 and the housing 32 or the keypad 36. Some sort of adhesive is going to be used to secure the cover template 56 into place.

When the cover template 56 is pried off to insert the intruding sensor 54, the ITO electrodes 58 are going to be damaged. Even if the cover template 56 is returned to the exact same location so that no tampering is visible, the ITO electrodes 58 have already been materially altered, and the intrusion detection procedure will reveal the tampering. This is because the adhesive holding the cover template 56 in place will be damaged. If ITO electrodes 58 are attached to the adhesive, they will be ripped apart. The ITO electrodes 58 may remain intact on the PED 30 and on the adhesive attached to the underside of the cover template 56, but yet they will also be broken.

Even if the cover template 56 were to be reattached without the insertion of an intruding sensor 54, and even if all the broken ITO electrodes 58 were again making electrical contact with each other, the original calibration would be ruined, and the ITO electrodes will now give a detectably different response to signal patterns when compared to the signals in the stored compensation matrix. Thus, even if the PED 30 continues to function, evidence of the tampering will be apparent to the present invention.

Advantageously, these ITO electrodes 58 or electrodes of any other comparable capacitance sensing system might be disposed on or over any surfaces that a person might try to cut through, pry up or otherwise gain access through in order to insert an intruding sensor 54 into the PED 30. Accordingly, this invention should not be considered to be limited only to the example given, but should be read to cover any surfaces of any device.

Another alternative embodiment of the present invention is the use of a breakable substrate. Along with a breakable substrate, it would also be necessary to provide a breakable insulating material that is disposed between layers of electrodes of either a complete touchpad 10, or the two or more electrodes being used in an alternative embodiment. Thus, a relatively delicate material can be used for electrodes such as ITO, the material used for the substrate, and for the material that is used to insulate layers of electrodes from each other.

Figure 6:
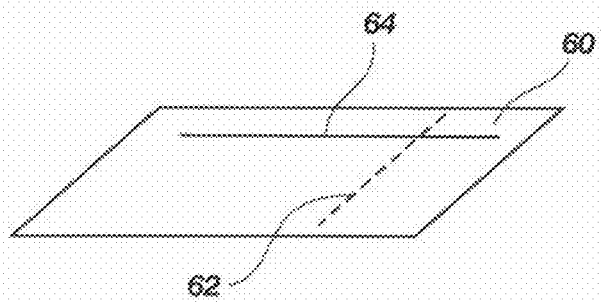
Figure 7:
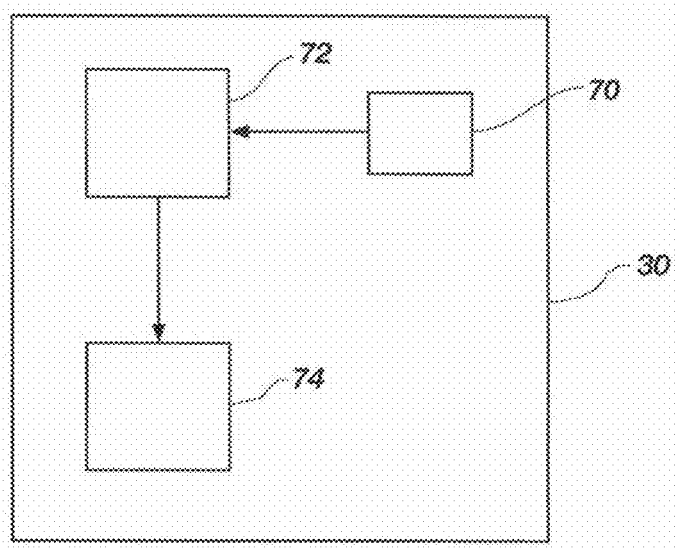
FIG. 7 is a block diagram of a PED processor that is deactivated by an Interlock circuit if tampering is detected.

For example as shown in FIG. 6, a substrate 60 can be provided having perforations 62 that will cause the substrate to tear along the perforation if someone attempts to pry open a cover template or a housing in order to access a normally hidden surface. Adhesive can be used to join a portion of the substrate 60 to a PED 30, and a different and break-away portion of the substrate 60 to an underside of the cover template. Thus, removal of the cover template will cause the substrate 60 to break or tear along the perforation 62, and thereby break at least one electrode 64 that is disposed on the substrate and across the perforation. Again, a comparison of a stored compensation matrix with a new compensation matrix created using the intrusion detection procedure will be different, and a sign that tampering may have occurred.

Figure 8:
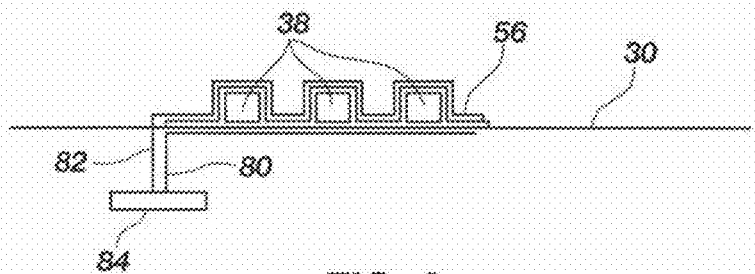
FIG. 8 is a cut-away profile view of electrodes coupled to touchpad circuitry for use in detecting an intruding sensor.

FIG. 8 is a block diagram showing another alternative embodiment of the present invention and its relationship to an Interlock circuit 72 of a PED 30. If certain types of tampering are detected by the intrusion detection system 70 of the present invention, the Interlock circuit 72 is designed to make the processing unit 74 of the PED 30 inoperative unless it is returned to a factory and reset by a qualified technician. In the present invention, the Interlock circuit 72 can be fed by electrodes 58 formed from ITO. Again, if the brittle and delicate ITO electrodes 58 are damaged or altered, the Interlock circuit 72 is activated, and the processing unit 74 of the PED 30 is shutdown until returned to a factory for servicing.

In another alternative embodiment of the present invention, it is observed that the layout of electrodes has typically been such that the electrodes are separated by only a thin substrate material. However, the electrodes can be arranged in other ways in order to achieve increased sensitivity in other dimensions.

In FIG. 8, a PED 30 has a cover template 56 over the keys 38. From touchpad detection circuitry 84, an X electrode 80 might be disposed on an inside cover or the interior of the PED 30, while the SENSE electrode 82 is placed on an exterior surface of the PED 30. Thus, the housing 32 or the cover template 56 of the PED 30 is now serving as the substrate material for the electrodes 80, 82. But consider also that there is now a substantial separation between the X and SENSE electrodes 80, 82. This separation expands the electric field between the X and SENSE electrodes 80, 82, and thereby expands the distance and dimensions in which the present invention can detect the intruding sensor.

The touchpad detection circuitry 84 is the same circuitry coupled to the XY electrode grid of a typical touchpad 10, but simply modified by being coupled to electrodes 80, 82 that are not arranged in the traditional touchpad array of planar electrodes.

The present invention is not limited to the specific examples herein of where the electrodes of a capacitance sensitive touchpad can be disposed in order to detect intrusion into a PED 30. The electrodes can be disposed inside the housing, on the exterior of the housing, or both inside and outside the housing. Accordingly, detection is not limited to an input area, but to any portion of the PED 30, including but not limited to a card swipe mechanism, etc.

The embodiments above are part of the first type of intrusion detection system that is in an "always on" mode of operation, and able to detect intrusion at any time as long as the circuitry has power. The second type of intrusion detection system of the present invention is related, but only operates in a more limited time frame.

Figure 9:
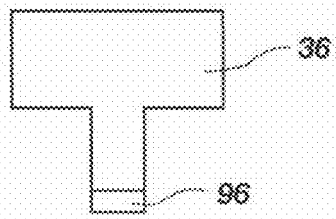
FIG. 9 is an individual key having a metal disk disposed on a contact end for use in the present invention.

The second type of intrusion detection system uses key "profiles", wherein the key profiles are only examined when a key is actuated. As shown in FIG. 9, a key 38 includes a conductive or dielectric material such as a metal disk 96 on a bottom end thereof. The key 38 is pressed downward so that the metal disk makes contact with a key detection system such as a detection circuit. In the present invention, the key detection circuit is the touchpad itself. Each key 38 makes contact with the surface of the touchpad 10 in a different location. Thus, when looking at the response of the touchpad 10, each key 38 has a unique signature because of its unique location on the touchpad and other factors such as the size of the metal disk 96, etc.

Each individual key 38 can be "profiled" at the factory by simply pressing on each key and looking at the response of the touchpad 10. Profiling is the step of recording how a signal appears to the touchpad when a particular key is pressed. Each key will have a unique "profile" on the touchpad. The profile for each key is then stored in the system. Insertion of an intruding sensor in a keypad 36 so that it can detect the actuation of keys 38 may become detectable by how that intruding sensor changes the profile of that key when it makes contact with the touchpad.

It is important to reiterate that in the present invention, there are two distinct intrusion detection systems that can be in operation at the same time. The general intrusion detection system is separate from the key tampering detection system, and operates as described previously. The key tampering detection system operates by comparing the profile of a key that is being pressed with all of the previously recorded key profiles.

An important aspect of the invention is to be able to change and customize the sensitivity of the general intrusion detection system and the key tampering detection system. In other words, the gain of the detection systems can be changed to provide more consistent performance in order to reduce false positives. False positives are a concern if they are being generated at a rate above some threshold value.

The threshold value for false positives will vary according to the particular use of a device. For example, a busy merchant is unlikely to want many false positives that would otherwise disrupt the flow of commerce at busy registers. Therefore, the threshold value might be raised (and the sensitivity of the system is reduced) for this particular application. The correct threshold value may only be determined after experimentation, and is therefore something that can be made adjustable so the merchant can make changes in a relatively simple manner.

By altering the gain or sensitivity of the touchpad, the false positives can be reduced without compromising the security of the PED. Accordingly, the intrusion detection system and the key tampering detection system each have their own customizable gain setting that can be altered by a technician and in some circumstances by a merchant. Thus, the detection systems can be set at different gain settings.

Another aspect of this invention that can take advantage of a modifiable gain setting is in the timing at which either system checks for tampering. For example, the gain might be kept low for a period of time. Then at predetermined intervals, the PED might run through a quick and higher gain intrusion detection procedure session to determine if any tampering has occurred that might not be detectable at a lower gain setting. The advantage is that less false positives will be generated during peak hours of operation. The system might also be modified to avoid any high gain intrusion detection procedure sessions depending upon the rate of use.

Even though the same touchpad is being used for the intrusion detection system and the key tampering detection system, the system is capable of performing all of the measurements simultaneously. At present, the system makes 48 individual measurements and comparisons 25 times every second. The number and frequency of measurements being made should not be considered a limiting feature of the present invention, and may be altered as desired.

Another aspect of the invention that should be mentioned pertains to the keys of a keypad. The keys include a key "On" threshold and a key "Off" threshold to be able to determine when a key has actually been pressed and not just accidentally tapped. It is desirable to makes these thresholds as accurate as possible. The more repeatable the detection of a keypress becomes, the lower the thresholds can be made. Lower thresholds result in easier detection of tampering with the PED and its keys.

The embodiments above are directed to the use of touch sensor circuitry to detect changes in the environment of a PED that may or may not include a touch sensor. In the next embodiments to follow, the technology of intrusion detection may also be adapted to prevent the theft of primary account numbers (PANs) and/or personal identification numbers (PINs) when using a card reader. More specifically, the next embodiment is directed to protecting PANs and PINs when using a financial card at locations such as automatic teller machines, gasoline pumps and even PEDs in a point-of-sale device.

What is relevant is that the devices for performing a financial transaction must include a card reader slot where a financial card may be inserted or swiped in order to perform a financial transaction. This card reader slot may be different from a slot used for swiping a financial card having a magnetic stripe.

This embodiment places capacitive sensing electrodes in strategic locations inside, outside or inside and outside a card reader slot where the financial card may be inserted.

Figure 10:
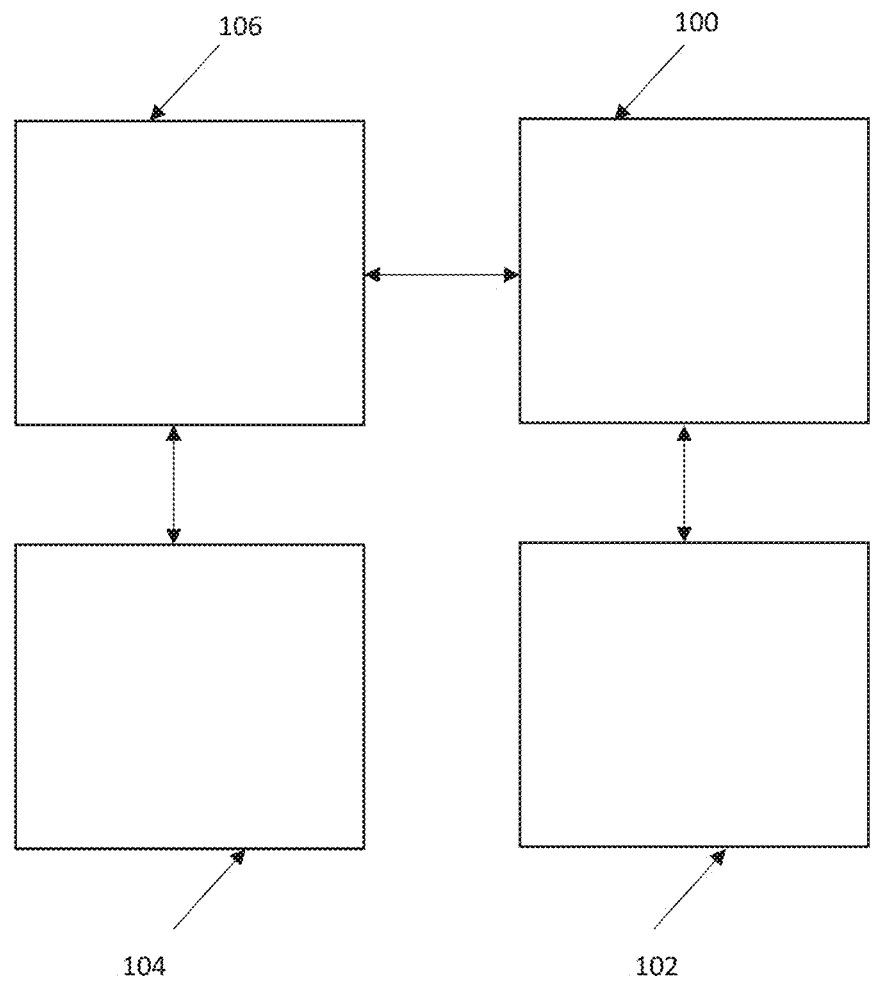
FIG. 10 is a block diagram of a card reader having capacitance sensing electrodes disposed adjacent to a card reader.

FIG. 10 is provided as a block diagram of some components of a new embodiment of the invention. This new embodiment is also capable of performing an intrusion detection procedure for detecting tampering, a probe, and insertion of a skimming device or some other alteration of the environment around a card reader that is detectable. The new embodiment of an intrusion detection system shows that the necessary elements are some type of input 104 such as a mechanical or touch sensor keypad, a card reader assembly 100 that includes a physical opening such as a card slot, a processing and communications module or circuitry 106, and a capacitive sensor module 102.

The communications routing between the various components are known to those skilled in the art. What is important in this new embodiment is that the capacitive sensor module 102 may come directly from use in a touch sensor such as a touchpad or touch screen, and may be adapted to provide capacitive sensing capabilities that enable the module 102 to detect changes in capacitance on electrodes. The capacitive sensor module 102 may therefore be used to determine if a skimming device has been attached to the outside of the card slot 108 in the card reader assembly 100, inside the card slot, or both inside and outside by detecting changes in capacitance on electrodes that are disposed adjacent to or within the card slot or the card reader assembly.

Figure 11A:
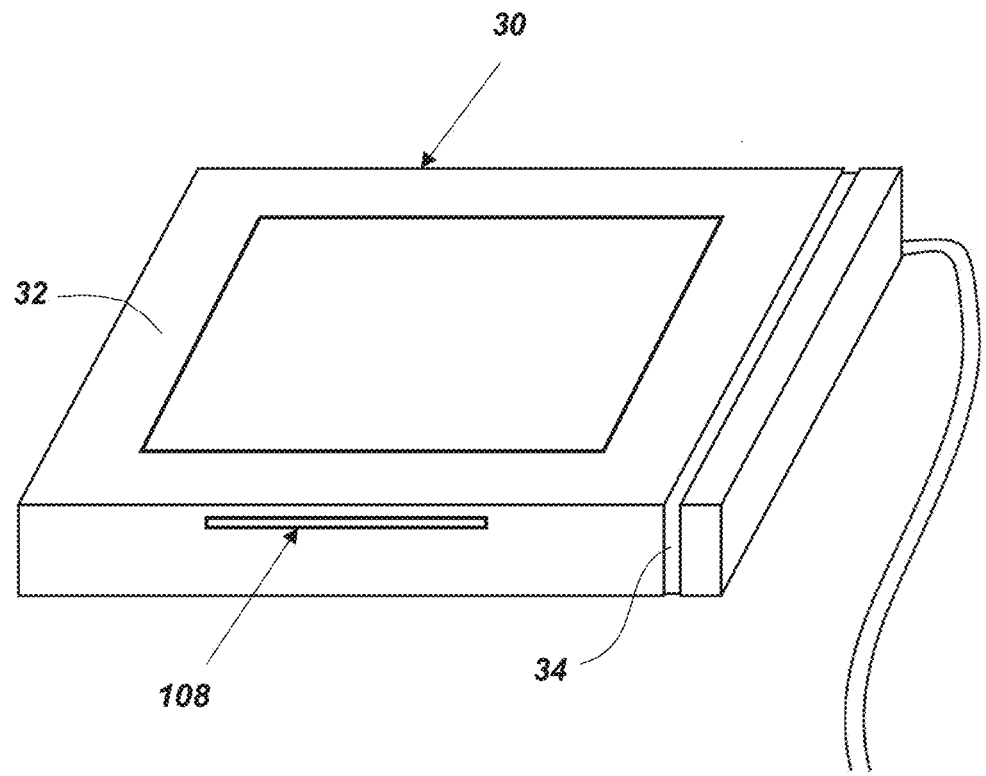
FIG. 11A is a perspective view of a housing of a Point-of-sale device having a magnetic strip reader and a card reader assembly that needs to be protected.

FIG. 11A is a perspective view of a Point-of-sale device 30 having a housing unit 32 that includes both a magnetic stripe reader 34 and a card reader assembly 100 having a card slot 108. It should be apparent that the POS device does not need to include the magnetic stripe reader but many POS devices are including both.

Figure 11B:
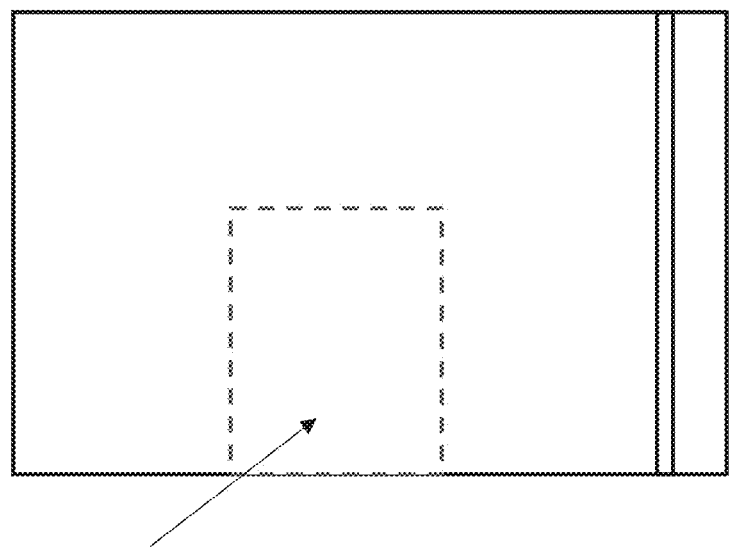
FIG. 11B is a top view of the Point-of-sale device showing the approximate position of a card slot within the body of the Point-of-sale device.

FIG. 11B is a top view of the Point-of-sale device 30 showing the approximate position of the card slot 8 within the body of the POS device 30.

Figure 12:
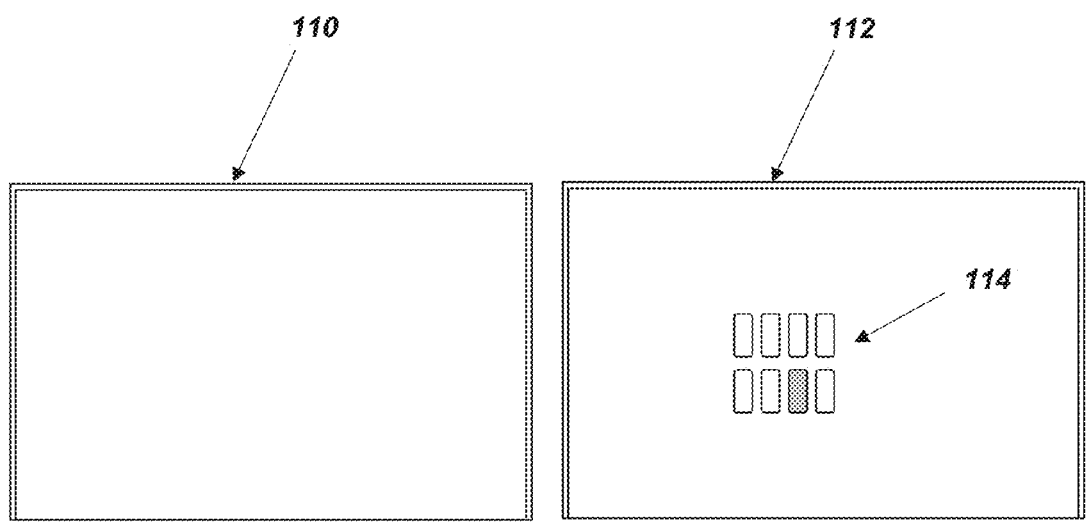
FIG. 12 is a top view showing both halves of a card slot split open to reveal electrical contacts that need to be protected within a card slot.

FIG. 12 is a top view of the card slot 108, where the card slot has been split open to reveal two halves. The typical orientation of a card slot 108 in a card reader assembly 100 is such that the card slot is either horizontal or vertical. The specific orientation is not material, but for descriptions purposes, it will be assumed that the card slot 108 is in a horizontal orientation and therefore there is a top half and a bottom half. It should be understood that the horizontal orientation is for illustration purposes only and the same explanation is application if the card reader assembly 100 is oriented in a vertical orientation having right and left halves.

FIG. 12 shows that there are no sensors on the top half 110. However, when the card reader assembly 100 is being used as a financial card reader for an EMV or smart card having a "chip" for more secure financial transactions, then the bottom half 112 may include contact connectors for making physical contact with the chip in the smart card. The card reader assembly may provide eight electrical contacts 114 for reading data from the smart card, but the number of electrical contacts may vary.

Figure 13:
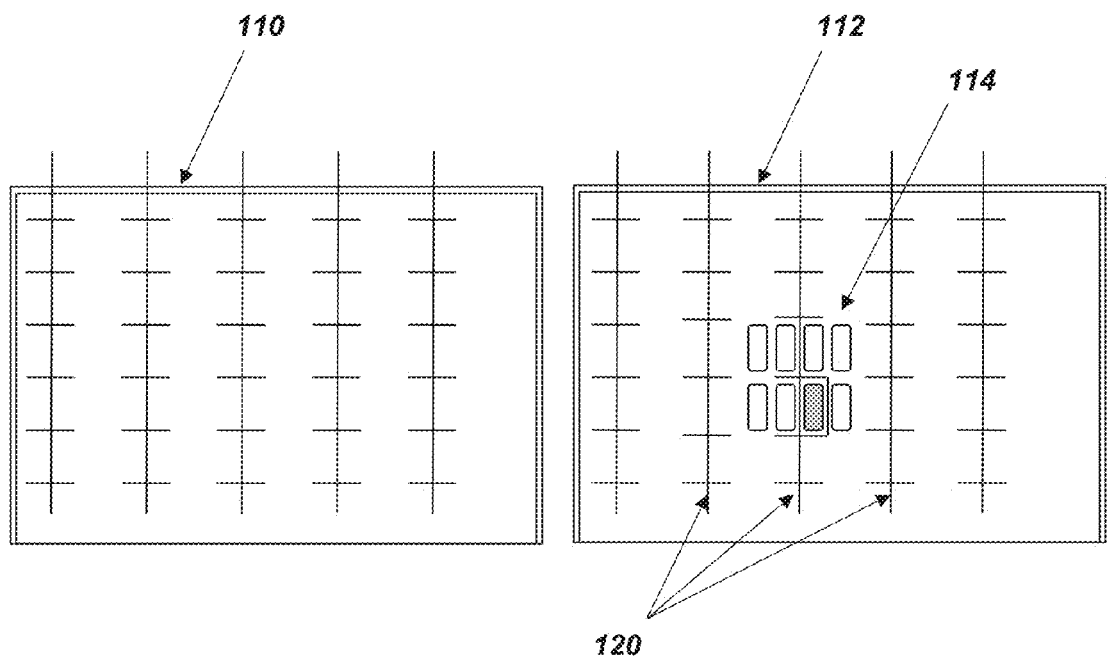
FIG. 13 is a top view showing both halves of a card slot split open to reveal a new embodiment that may utilize a plurality of electrodes for sensing an intrusion in the card reader assembly.

FIG. 13 shows a first embodiment of a layout of intrusion detection electrodes 120 that may be disposed within the card slot 108. The intrusion detection electrodes 120 may be disposed so as to be adjacent to the electrical contacts 114 and to also be disposed throughout the two halves 110, 112 of the card slot 108. It is noted that the electrical contacts 114 are surrounded by the intrusion detection electrodes 120, and may be disposed on both halves 110, 112 or just on a single half.

Figure 14:
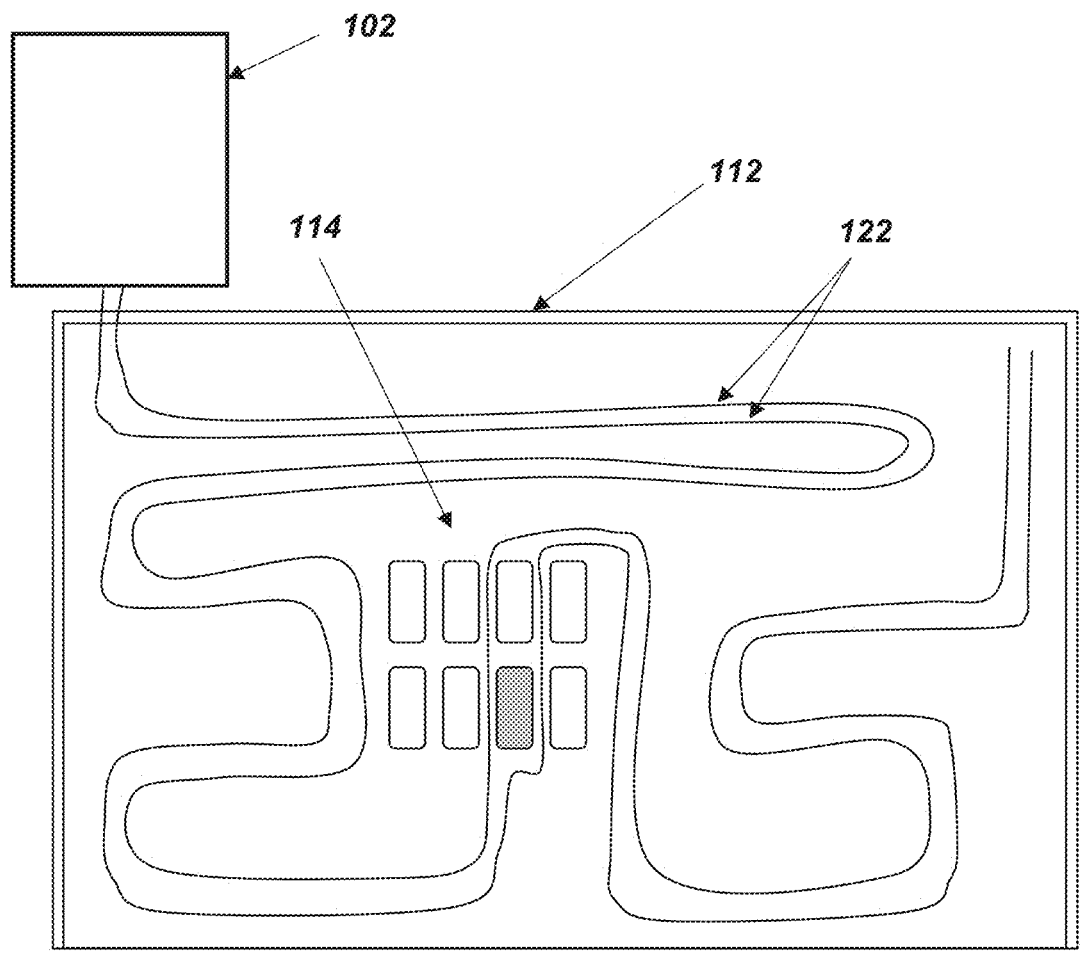
FIG. 14 is a top view showing both halves of a card slot split open to reveal another embodiment that may utilize two electrodes for sensing an intrusion in the card reader assembly.

FIG. 14 shows a top view of an alternative embodiment, wherein the intrusion detection electrodes 122 may be two electrodes that follow any path that has the electrodes travel through most of the space within the card slot 108. The intrusion detection electrodes 122 also move between at least some of the electrical contacts 114. This figure also illustrates that the capacitive sensor module 102 is coupled to the intrusion detection electrodes 122 and to the intrusion detection electrodes 120 in FIG. 13.

The new embodiments shown in FIGS. 13 and 14 may use self-capacitance or mutual capacitance measurements to detect changes in capacitance on the intrusion detection electrodes 120 and 122.

Capacitive sensor module 102 may be used to detect an object or objects on the surface of a touch sensor such as a touchpad or touch screen. When a capacitance sensitive touch sensor is turned on, it may create a temporary compensation matrix that allows the capacitive sensor module to adjust for changes in the circuits or in the detectable area of the touch sensor that occurred while the touch sensor was off. In the prior art, this temporary compensation matrix is only created when the touch sensor is turned on. The compensation matrix is not updated or changed, and is stored in volatile memory. When the touch sensor is turned off, the compensation matrix data is lost. Thus, there is no permanent record made of the environment around the touch sensor that is stored in the compensation matrix.

The new embodiments shown in FIG. 10 through 14 of the invention change the type of data that is stored and how and when that data is used. The first change of the embodiments is to store an intrusion detection matrix in non-volatile memory. The intrusion detection matrix may, for example, be stored in non-volatile memory disposed within the processing and communications module 106 or in the capacitive sensor module 102. An initial intrusion detection matrix is created the first time that the card reader assembly 100 is activated after it is mounted inside a housing. The first measurement might take place at a factory before the card reader assembly 100 and housing are shipped, or it may take place on location, such as when the card reader assembly 100 is inserted into a gasoline pump.

The second change of the new embodiments shown in FIGS. 10 through 14 is to not erase but instead to always keep the intrusion detection matrix stored in memory even after the card reader assembly 100 is turned off. In this way, any changes, such as the insertion of a probe into the card slot 108 of the card reader assembly 100 or the creation of an opening into the housing will be recognized as changes in the environment that is detectable by the capacitive sensor module 102. The change in the environment will simply be a difference between the initial intrusion detection matrix stored in the non-volatile memory and any new measurement that is taken after that time, such as when the card reader assembly 100 is turned on for use.

If values of the measurements of the card reader assembly 100 using the capacitive sensor module 102 and the initial intrusion detection matrix change to a sufficient amount, then it is determined that the environment of the card reader assembly 100 has been altered. The alteration may be the insertion of a skimming device into the card slot 108 of the card reader assembly 100, a skimming device placed on the outside, or some type of skimming device placed both inside and outside. The card reader assembly 100 must then take appropriate action, such as deactivating card reader assembly and notifying an owner of the intrusion.

It is expected that the capacitance will change in the card reader assembly 100 when a financial card is inserted. However, skimming devices are inserted into a card reader assembly 100 and remain there to intercept data with each financial card that is inserted into the card slot 108. If the intrusion detection electrodes 120 or 122 are removed, cut or altered, the measured capacitance will change.

In any of the embodiments, the intrusion detection electrodes 120, 122 may be disposed on a thin plastic substrate with patterned electrodes on one or two layers. The patterns may be an array of transmit and receive electrodes with some pitch that would be typical of 4 mm. Each electrode 120, 122 may be multiplexed to be a drive electrode, a sense electrode, or a self-capacitance electrode, they may be dedicated electrodes to a single function. A capacitance measurement would then be made between the various electrodes for comparison with the intrusion detection matrix.

Any object of notable size, whether conductive or dielectric and that is inserted into the card slot 108, may alter the capacitance measurements and be detected. A primary location of the intrusion detection electrodes 120, 122 may be immediately adjacent to the electrical contacts 114 in the card slot 108. Another location for intrusion detection electrodes 120, 122 may be any cavity that may exist in the card reader assembly 100 where a skimming device may want to locate its electronics.

The embodiment of the serpentine intrusion detection electrodes 122 may have advantages over the many intrusion detection electrodes 120 of FIG. 13 because of less complexity in measurements. For example, there is only one single measured value to compare when there are only two intrusion detection electrodes 122 being used for measurements as in FIG. 14. In contrast, there are many comparisons to be made when there are multiple intrusion detection electrodes 120 being measured as in FIG. 13.

In all of the embodiments, the intrusion detection electrodes 120, 122 may be made from virtually transparent ITO such that a potential intruder may not be able to see the electrodes on the substrate, and thereby making it more difficult to construct a skimming device that may defeat security measures.

In all of the embodiments, the intrusion detection electrodes 120, 122 may be printed on the housing of the card reader assembly 100 with conductive ink to thereby reduce mechanical movement or variation of electrodes that effects baseline measurements, and further reduce costs.

In all of the embodiments, the intrusion detection electrodes 120, 122 may be embedded in the housing, such as through injection molding or lamination. This technique may further hide the electrodes from potential intruders that are looking for ways to identify and defeat security features. Alternatively, a substrate with electrodes could be glued or laminated to the outside housing around the card slot 108, then it could be painted to make it look like any other outside part of the housing. The housing in this case could be plastic, wood or even a conductive metal. In another embodiment, the substrate with electrodes could be glued or attached to the inside of the housing provided that the housing is nonconductive.

In the case of skimming devices that are attached on the outside of card readers, the same techniques apply except there is only one surface to apply the intrusion detection electrodes 120, 122 and to make measurements. There are also other restrictions on the outside surface that are different than the inside of a card slot 108 such as aesthetics.

Figure 15:
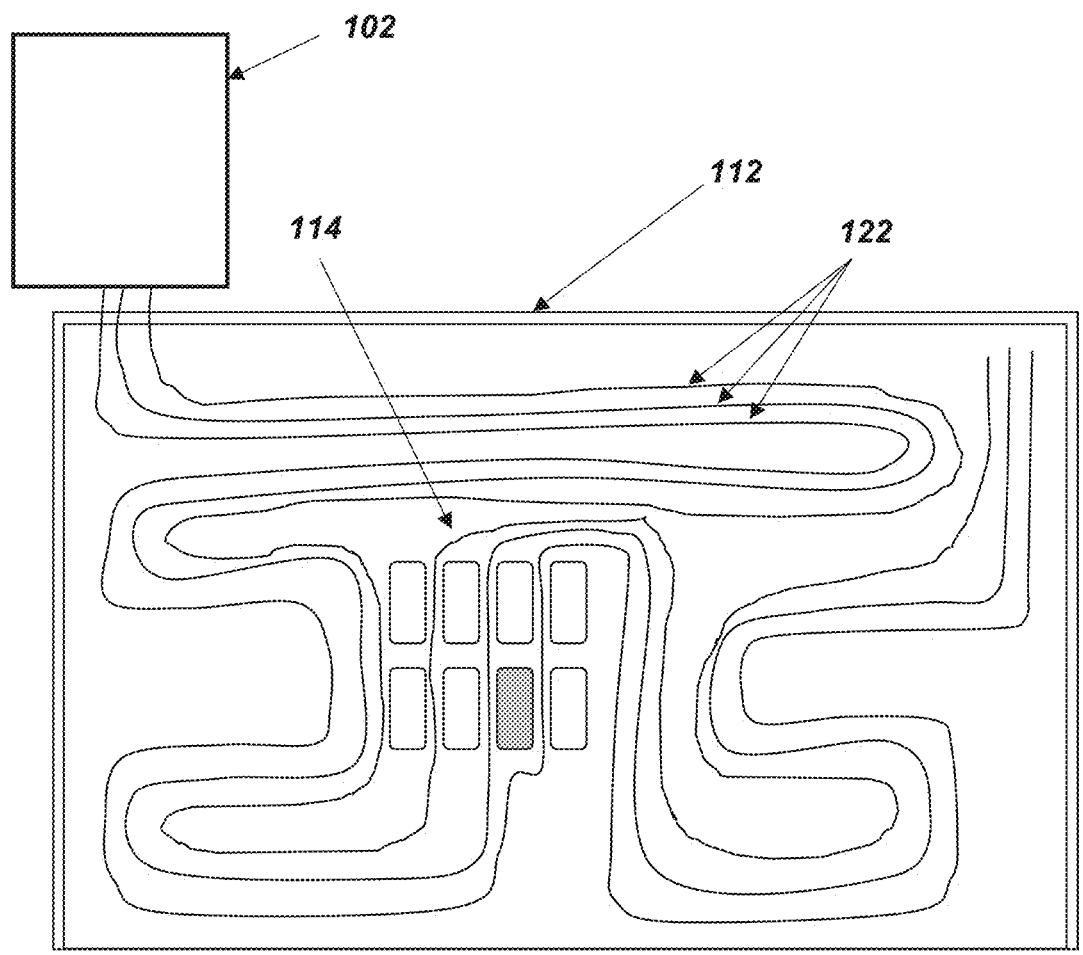
FIG. 15 is a top view showing both halves of a card slot split open to reveal another embodiment that may utilize three electrodes for sensing an intrusion in the card reader assembly.

FIG. 15 illustrates that another embodiment of the invention may be to use three separate electrodes 124 to send signals to the capacitive sensor module 102. The three electrodes 124 may or may not be spaced evenly apart from each other and may cover the entire area of interest. The three electrodes 124 may be a positive drive electrode and a negative drive electrode as the two outer electrodes, and a sense electrode as the middle electrode. The advantage of this configuration may be a higher degree of sensitivity for detecting an intruding skimming device or probe.

Another advantage of the three electrodes 124 is that they create a balanced electric field when driven in phase to thereby obtain a longer reach.

Another embodiment is that the three electrodes 124 may be driven and sensed as self-capacitance electrodes 124, thereby using a ground as a reference.

The different configurations of intrusion detection electrodes 120, 122 and 124 shown in FIGS. 13, 14 and 15 may be capable of detecting different kinds of skimming devices because of their different sensitivities and reach.

All aspects of the embodiments of the PED in FIGS. 2 through 9 may be combined with all aspects of the card reader assembly shown in FIGS. 10 through 15.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for performing intrusion detection on a card reader by comparing intrusion detection measurements, said method comprising:
    providing a card reader assembly in a housing, the card reader assembly including a card slot for receiving a card to be read;
    providing a capacitive sensor module for detecting changes in capacitance on intrusion detection electrodes, wherein the intrusion detection electrodes are disposed adjacent to the card slot and coupled to the capacitive sensor module and dedicated to detection of conductive or dielectric objects that cause an imbalance of electrical charges on at least one of the intrusion detection electrodes;
    creating an intrusion detection matrix by transmitting at least one signal pattern from the intrusion detection electrodes, receiving at least one response on the intrusion detection electrodes, and storing the at least one response in the intrusion detection matrix to show an initial imbalance of electrical charges on the intrusion detection electrodes, the intrusion detection matrix being stored in non-volatile memory that is not erased when the card reader is shut off;
    performing an intrusion detection procedure by transmitting the at least one signal pattern from the intrusion detection electrodes, receiving at least one new response on the intrusion detection electrodes and comparing the at least one new response to the initial imbalance of electrical charges stored in the intrusion detection matrix stored in the non-volatile memory to determine if an object has caused a change in capacitance on the intrusion detection electrodes; and
    performing an action if it is determined that the at least one new response is different from the initial imbalance stored in the intrusion detection matrix, the action being selected from the group of actions comprised of taking no action and letting the card reader to continue operating but sending an alert signal, shutting down the card reader, or a combination of these actions.

2. The method as defined in claim 1 wherein the method further comprises disposing the card reader assembly within a point-of-sale (POS) device that includes a Personal Identity Number (PIN) Entry Device (PED), the POS functioning as the housing.

3. The method as defined in claim 2 wherein the method further comprises performing the intrusion detection procedure each time that power is applied to the card reader.

4. The method as defined in claim 2 wherein the method further comprises constructing the intrusion detection electrodes from Indium-Tin Oxide (ITO) so that the intrusion detection electrodes are easily damaged.

5. The method as defined in claim 2 wherein the method further comprises:
    providing an Interlock circuit in the card reader;
    detecting an intrusion;
    sending a signal to the Interlock circuit that the card reader should be shut down; and
    removing power from the card reader using the Interlock circuit.

6. The method as defined in claim 2 wherein the method further comprises disposing at least two of the intrusion detection electrodes inside the card slot.

7. The method as defined in claim 2 wherein the method further comprises modifying sensitivity of the intrusion detection procedure to thereby improve performance of the intrusion detection system.

8. The method as defined in claim 7 wherein the method further comprises operating a second intrusion detection system at the same time as the first intrusion detection system.

* * * * *